(12) United States Patent
Westerberg et al.

(10) Patent No.: US 11,859,648 B1
(45) Date of Patent: Jan. 2, 2024

(54) SYSTEM AND METHOD FOR PROVIDING A JOINT BETWEEN PARTS OF AN OBJECT WITHOUT COMPROMISING STRUCTURAL FACTORS OF THE OBJECT

(71) Applicant: LOCKHEED MARTIN CORPORATION, Bethesda, MD (US)

(72) Inventors: John Westerberg, Keller, TX (US); Jesse Rich Cannon, Grand Prairie, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 405 days.

(21) Appl. No.: 16/870,101

(22) Filed: May 8, 2020

(51) Int. Cl.
  *F16B 17/00* (2006.01)
  *F42B 15/36* (2006.01)

(52) U.S. Cl.
  CPC ............ *F16B 17/004* (2013.01); *F42B 15/36* (2013.01)

(58) Field of Classification Search
  CPC .............................. F16B 17/004; F42B 15/36
  See application file for complete search history.

(56) References Cited

U.S. PATENT DOCUMENTS

| | | | |
|---|---|---|---|
| 3,863,570 A | 2/1975 | Bixby | |
| 3,977,800 A | 8/1976 | Cassel | |
| 4,594,829 A | 6/1986 | Herrgord | |
| 5,209,541 A | 5/1993 | Janotik | |
| 5,394,803 A * | 3/1995 | Mort | F42B 15/36 102/377 |
| 6,343,770 B2 | 2/2002 | Holemans | |
| 7,367,738 B2 | 5/2008 | Cleveland | |
| 2017/0341782 A1* | 11/2017 | Rivas Sánchez | B64G 1/645 |

* cited by examiner

Primary Examiner — Kyle A Cook
(74) Attorney, Agent, or Firm — Terry M. Sanks, Esq.; Beusse Sanks, PLLC (57) ABSTRACT

A joint system including a support device with a plurality of radial extensions extending in at least a first direction from the support device, each individual radial extension of the plurality of radial extensions terminating at a distal engagement end and a receiving device separate from the support device with a notch area to receive the distal engagement ends of each radial extension of the plurality of radial extensions and a contact area upon which a length of the radial extensions of the plurality of radial extensions engage when the distal engagement end of each radial extension of the plurality of radial extensions are engaged within the notch area. At least one radial extension of the plurality of radial extensions is configured to be flexible between a first position to provide for at least one of assembly and disassembly of the support device to the receiving device and a second position when the support device and the receiving device are assembled. Another system and method are also disclosed.

14 Claims, 12 Drawing Sheets

SYSTEM AND METHOD FOR PROVIDING A JOINT BETWEEN PARTS OF AN OBJECT WITHOUT COMPROMISING STRUCTURAL FACTORS OF THE OBJECT

BACKGROUND

Embodiments relate to securing and detaching parts and more specifically to providing a joint system that rapidly connects and detaches two parts of an object without compromising structural factors of the object.

Mechanical objects typically have a structure where the structure is often made up of parts. Structural connections are intended to essentially keep the parts attached to each other. Structural interfaces are intended to allow the parts to be easily attached and detached. In both cases, the design of structural connections and interfaces requires a consideration of structural factors such as, but not limited to, stiffness, load capability, volume efficiency, ease of assembly, etc.

These structural factors are particularly relevant for aerial vehicles. Depending on the size or diameter of such aerial vehicles these structural factors are more important. For example, aerial projectiles such as a missile are being designed to have a small diameter, even less than one inch in diameter.

When developing joints for an object having a small diameter, prior art joints trade between joint stiffness, load capability, volume efficiency, and ease of assembly. For example, increasing bolt size of a bolted joint increases load capability and stiffness, but also increases volume usage (decreasing volume efficiency). In another example, replacing bolted joints with a Marman clamp can increase load capability for a given volume, but at the expense of joint stiffness.

More specifically, for a small diameter missile, with respect to bolted joints, while volume efficiency requirements may be met, only average stiffness requirements may be met, load capability cannot be met, and ease of assembly is not possible as a significant number of bolts are required. When a single structure, though stiffness requirements, load capability and volume efficiency may be met, ease of separation or assembly is not possible. When considering a collet device, while stiffness requirements, volume efficiency requirements and ease of assembly may be achieved, load capability is not realized as a collet device cannot handle an axial load. When considering other prior art missile restraints, volume efficiency requirements may be met. However, stiffness requirements and load capability requirements are not met since this restraint cannot handle moments. Furthermore, ease of assembly is limited since access from the outside of the missile is not possible.

For a small-scale missile, for example, such as, but not limited to, one with a diameter less than one inch, all of these factors are critical. Therefore, instead of a joint that results in a tradeoff between structural requirements, a joint that is capable of meeting stiffness requirements, load capability, volume efficiency and ease of assembly is desired.

SUMMARY

Embodiments relate to a joint system and a method for providing a joint or connector system between two parts of an object while the joint provides for rapid connectivity and separability while maintaining structural factors of the object. The joint system comprises a support device with a plurality of radial extensions extending in at least a first direction from the support device, each individual radial extension of the plurality of radial extensions terminating at a distal engagement end. The joint system further comprises a receiving device separate from the support device with a notch area to receive the distal engagement ends of each radial extension of the plurality of radial extensions and a contact area upon which a length of the radial extensions of the plurality of radial extensions engage when the distal engagement end of each radial extension of the plurality of radial extensions are engaged within the notch area. At least one radial extension of the plurality of radial extensions is configured to be flexible between a first position to provide for at least one of assembly and disassembly of the support device to the receiving device and a second position when the support device and the receiving device are assembled.

Another joint system comprises a dual sided radial joint having a first plurality of radial extensions extending in at least a first curved arrangement from the joint and a second plurality of radial extensions extending in at least a second curved arrangement. The joint system further comprises a first notched receiver to receive ends of the first plurality of radial extensions wherein the first plurality of radial extensions transition from a curved arrangement to a straight arrangement when within the first notched receiver and a second notched receiver to receive ends of the second plurality of radial extensions wherein the second plurality of radial extension transition from the curved arrangement to a straight arrangement when within the second notched receiver. At least one of the first notched receiver and the second notched receiver has a contact area upon which a length of the radial extensions engages when the distal engagement ends of each radial extensions are engaged within the at least first notched receiver and second notched receiver.

The method comprises activating a force to cause a device to move away from the force. Though not limited, the force may be the result of a detonation, such as an explosive detonation. The method further comprises releasing a first plurality of radial extensions held by the device to a first notched receiver of a first structure as the device moves away from the force which causes the first structure to move away from a second structure. The method further comprises releasing the second plurality of radial extensions held by the first structure to the second notched receiver of the second structure as the first structure moves away from the second structure.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of the scope of this disclosure, the embodiments will be described and explained with additional specificity and detail through the use of the accompanying drawings in which.

DETAILED DESCRIPTION

Embodiments are described herein with reference to the attached figures wherein like reference numerals are used throughout the figures to designate similar or equivalent elements. The figures are not drawn to scale, and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective analytically predicted results based on finite element analysis. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1:
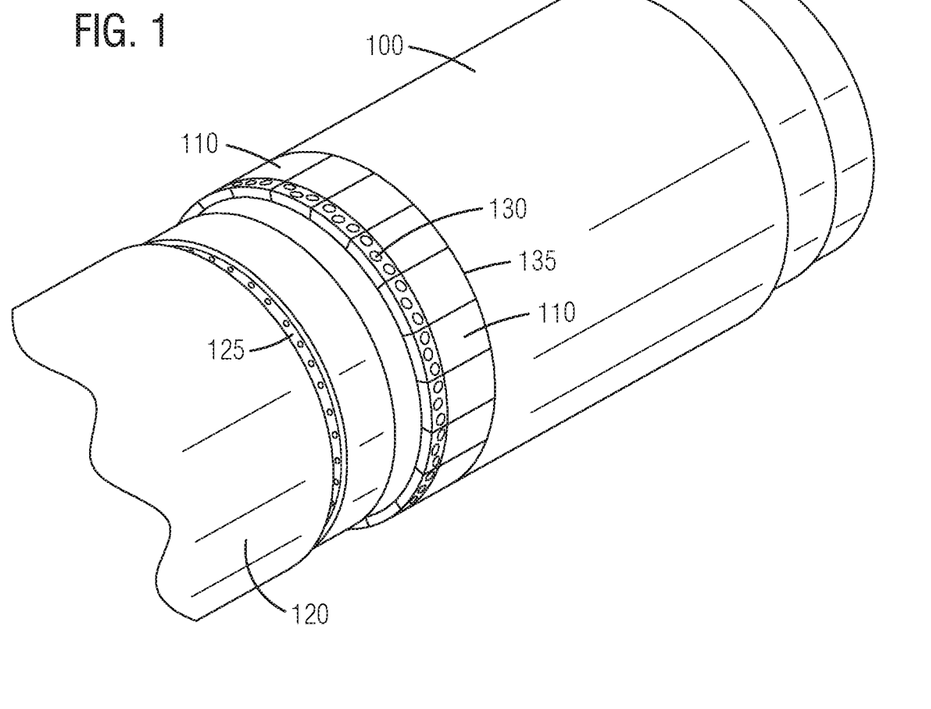
FIG. 1 shows an embodiment of a joint.

FIG. 1 shows an embodiment of a joint. The joint 100, connector, support device, joining device or single sided radial flexure ring, has a plurality of radial extensions, or flexors, 110 extending in at least a first direction from the joint 100. The radial extensions 110 may be a multitude of radially compliant beams 110 or "flexures" that are pressed into a notch or notch area 125 in an adjoining part of a structure, 120. At a distal end of the radial extensions 110, a securing device may be used to further secure the joint 100 to the adjoining part of the structure.

A contact surface 135 is provided along a length of the radial extensions 110. This contact surface 135 is provided to engage or contact the radial extensions 110 to constrain a shape of the radial extensions 110. Thus, the contact surface 135 improves the structural capability of the radial extensions 110 such as, but not limited to, preventing buckling and reducing radial extension stresses by spreading those stresses along the length of each radial extension 110. Additionally, as disclosed, an amount of deflection of the radial extension 110 is reduced, thus allowing for thicker radial extensions 110, which enables a more structurally capable embodiment.

As further shown in FIG. 1, the securing device may comprise openings or holes 130 at the distal end of the radial extensions 110 through which bolts 310 may be inserted. In another non-limiting example, the securing device may be a ring that slides over the distal end of the radial extensions 110 once they are within the notch or notch area 125. Because of the arrangement of the radial extensions 110, the joint 100 provides for an additional area for equipment 120 to fit within the joint 100 at an end 135 where the radial extensions 110 attach to the joint 100.

Though not shown, the joint 100 may comprise a connector attachable to a first part of an object that is a part of a structure. The connector may have a threaded component and the object that the joint may attach to may comprise receiving threads.

Figure 2:
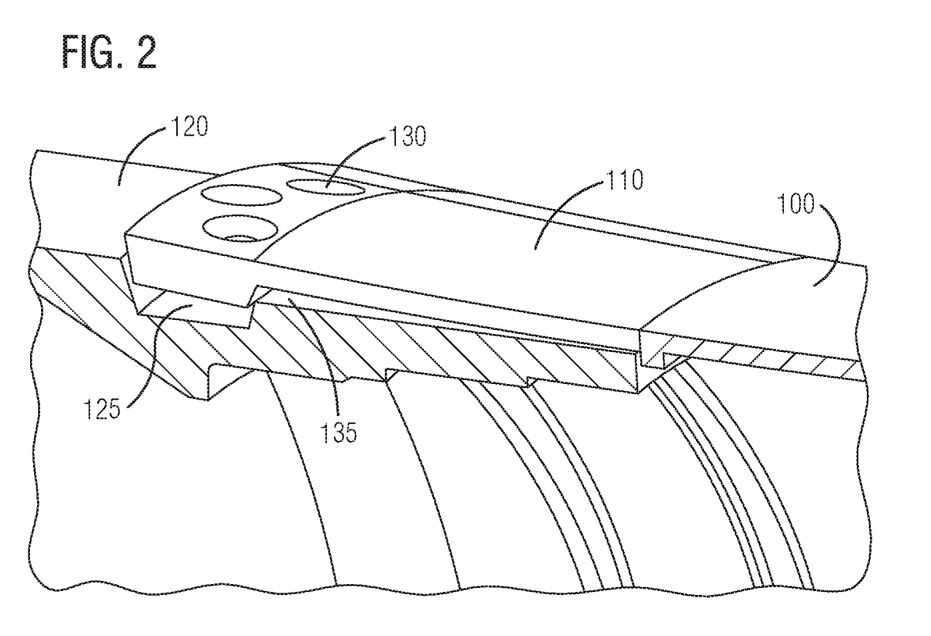
FIG. 2 shows an embodiment of an upper cross section of the joint engaged with a receiving part.
Figure 3:
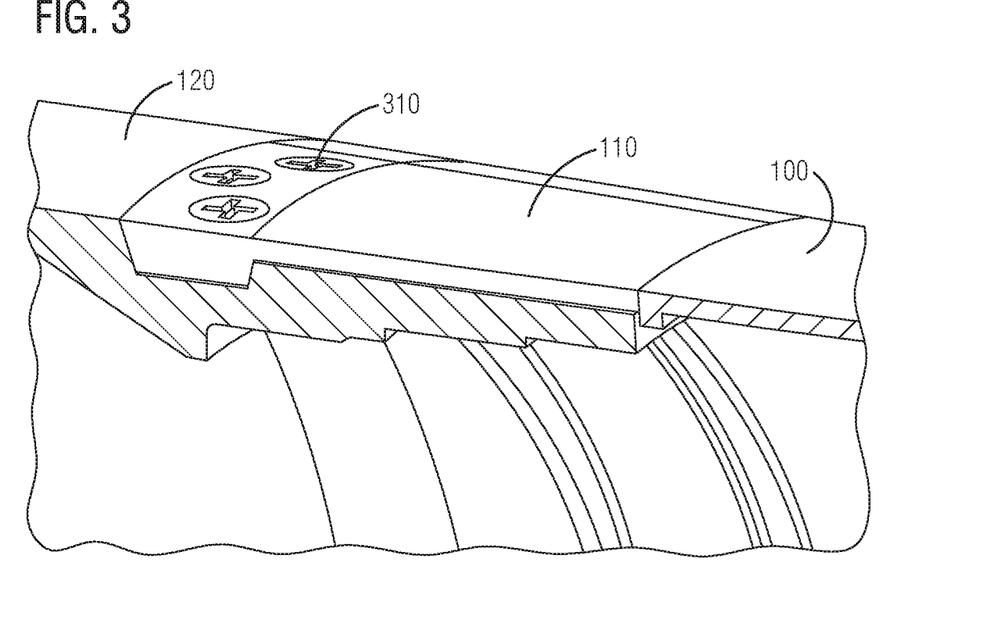
FIG. 3 shows the upper cross section of the joint shown in FIG. 2 with bolts engaged.

FIG. 2 shows an embodiment of an upper cross section of the joint engaged with a receiving part and FIG. 3 shows the upper cross section of the joint shown in FIG. 2 with bolts 310 engaged. As shown, the radial extensions 110 engage notch or notch area 125 of the structure 120. In another non-limiting example, a clamp may be used to secure the radial extensions 110 to the structure 120. As further shown in FIG. 3, bolts 310 are inserted through the openings 130 to secure the radial extensions 110 to the structure 120.

When the radial extensions 110, which begin in an initially curved arrangement as disclosed herein, are connected to the notched area 125, they may be pressed into a straight arrangement by way of the contact surface 135. In an embodiment, the radial extensions 110 may have a downward curved arrangement to create a smaller diameter than when the radial extensions are not within the notched area 125. In another embodiment, the radial extensions may have a curved arrangement in an opposite or upward direction. Utilizing the embodiments disclosed herein, more rapid connecting or separation from an adjacent part of a structure is realized while not compromising the strength of the joint when fully assembled when compared to prior art joints. Thus, as explained above, the plurality of radial extensions 110 may be configured to be flexible between a first position to a second position where the first position may provide for a curved arrangement and the second position provides for a straight arrangement. The first position is realized prior to assembly and after disassembly of the support device 100 (or as disclosed below 400) to or from the receiving device 120. The second position is realized when the support device 100 and the receiving device 120 are assembled. Thus, the support device mentioned above may also be the dual sided flexure ring 400 as discussed further herein.

Figure 4:
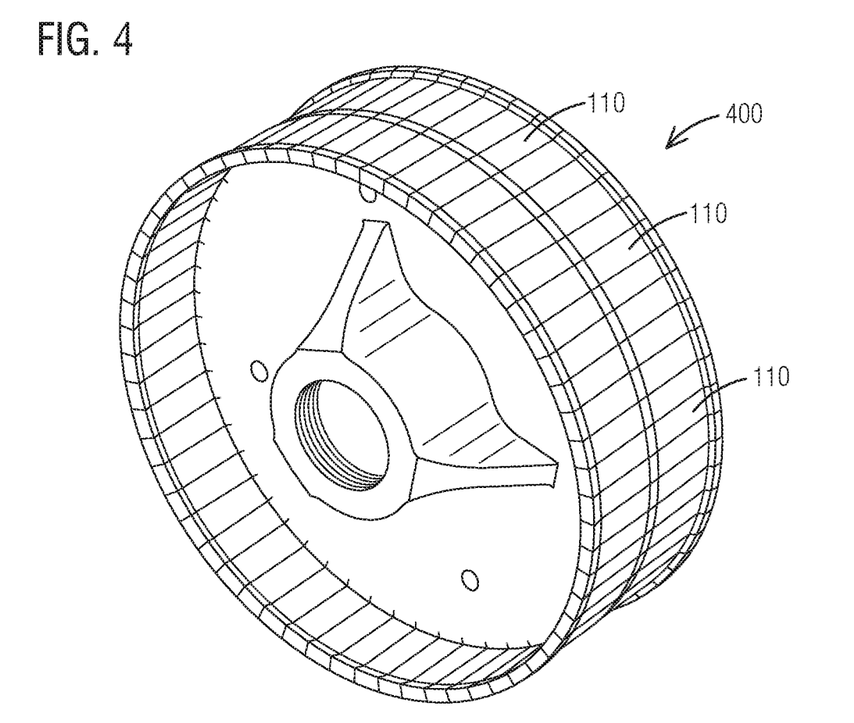
FIG. 4 shows an embodiment of a dual sided flexure ring.

FIG. 4 shows an embodiment of a dual sided flexure ring. Though shown as a ring or having a cylindrical arrangement, this geometric shape is not limiting as any geometric shape may be provided. The geometric shape of the dual sided flexure ring 400 may be which is best based on an intended connection of the parts of a structure. A ring is shown herein as a ring shape may be a preferred embodiment for a small-scale missile.

Figure 5:
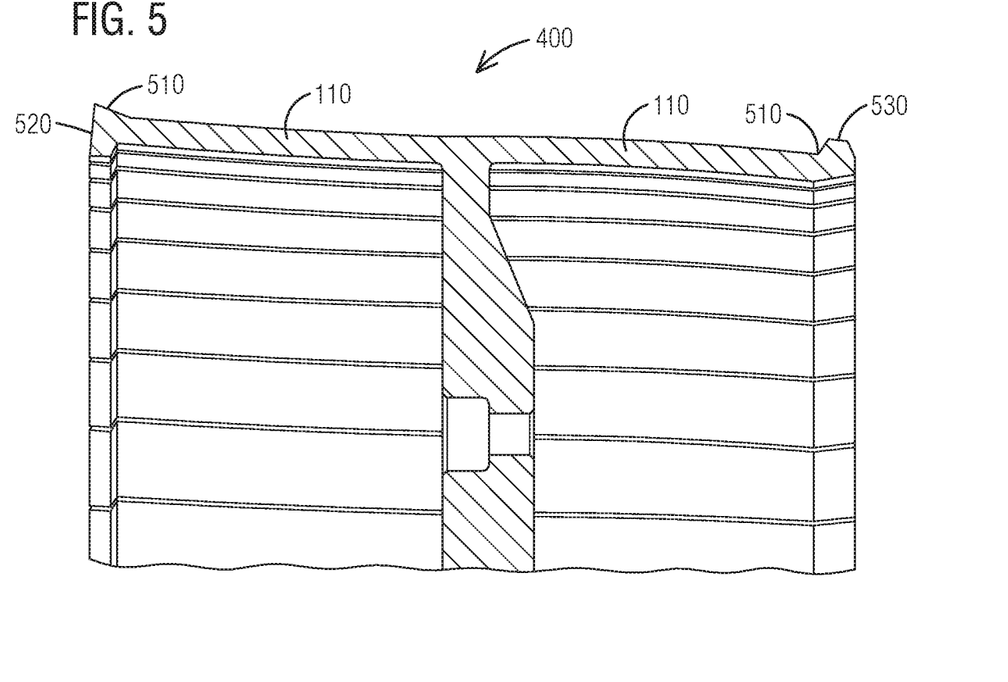
FIG. 5 shows a cross sectioned view of the dual sided flexure ring.

FIG. 5 shows a cross sectioned view of the dual sided flexure ring. The dual sided flexure ring 400 has two sets of plurality of radial extensions 110. As shown, the two sets of plurality of radial extensions 110 extend in opposite directions from the ring 400. A distal end 510 of each radial extension 110 may have an insertion element 520, 530 that fits within the notched area 125 of the adjacent part 120. The first insertion elements 520 of a set of radial extensions 110 extended in a same direction may be facing in a downward direction. The second insertion elements 530 of a second set of radial extensions 110 extended in a second same direction may be facing in an upward direction. Though the dual sided flexure ring 400 is shown having insertion elements 520, 530 extending in opposite directions based on the direction the radial extensions extend, this arrangement is not limiting. In another embodiment, the insertion elements 520, 530 may extend in a same direction, either upward or downward. As disclosed further herein, the dual sided flexure ring 400 may be used as a separating joint in conjunction with an actuation device and a release mechanism.

Figure 6:
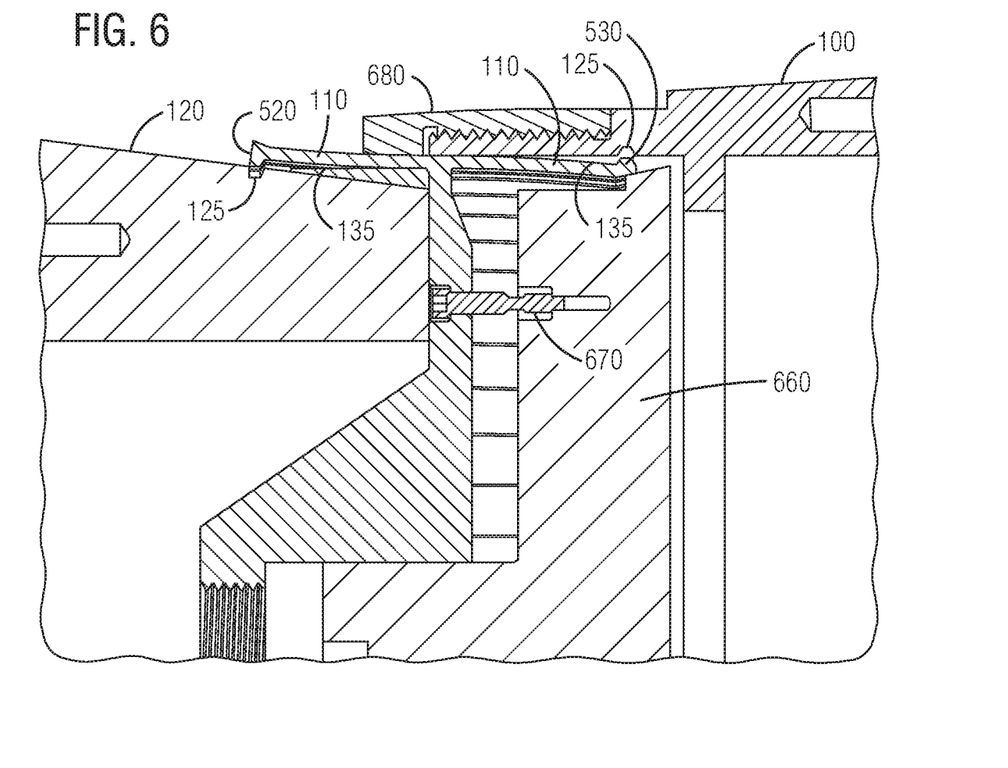
FIGS. 6 and 7 show a first installation of the dual sided flexure ring.
Figure 7:
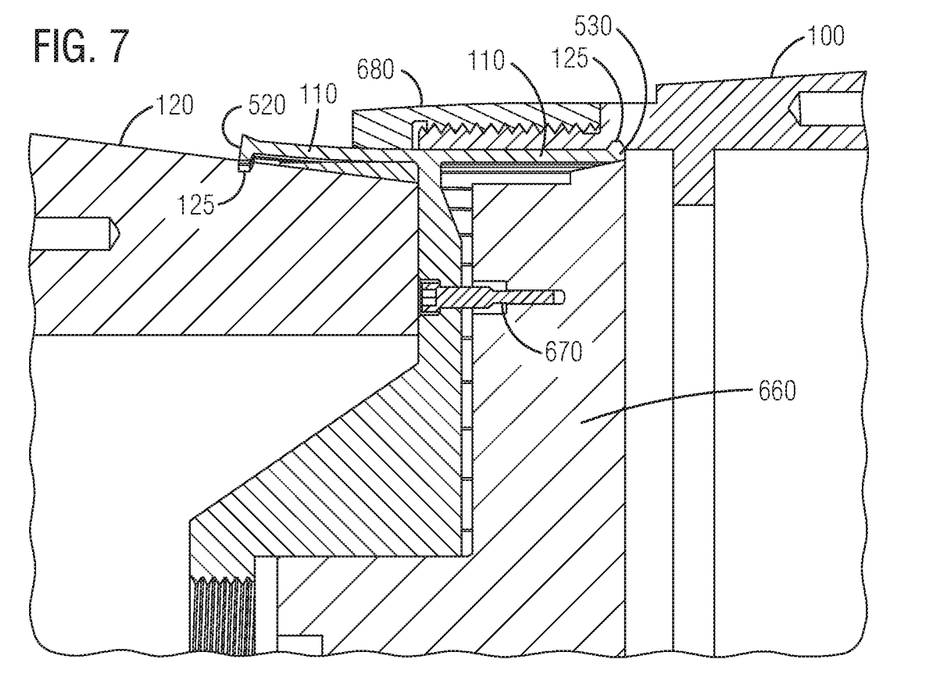

FIGS. 6 and 7 show installation of the dual sided flexure ring as a joint. FIGS. 6 and 7 are cross sections of an upper half of the dual sided flexure ring 400 between the structure 120 such as, but not limited to, a missile, and the joint 100. As discussed above, at the distal ends of the radial extensions 110, the insertion elements 520, 530 are provided. As discussed above, depending on the placement of the notched area, 125, the insertion elements 520, 530 may be facing in a first direction on the first plurality of radial extensions 110 and in an opposite direction on the second plurality of radial extensions 110. The arrangement of the insertion elements 520, 530 may be determined by the location of the respective notched areas 125.

Also shown in FIGS. 6 and 7 is a release mechanism 660 that may comprise a piston or movable device. By placement of the piston 660 when connecting the structure (i.e., receiving device 120) and the joint 100, the piston 660 may move towards the structure joint 120. As the piston 660 is moved towards the structure 120, the piston 660 may engage with a back side of the first plurality of radial extensions 110 and locks them into the notched area 125. In another embodiment, such as disclosed below with respect to FIGS. 13 through 17, the piston 660 may move radially outward to engage and lock the extensions 110. As explained later herein, the movable device 660 may be used to cause separation of the joint 100 from the structure 120.

Also shown in FIGS. 6 and 7 is a retention device 670. The retention device 670 may be a frangible bolt or screw which holds the movable device 660. The retention device 670 is designed to break when under load.

As shown in FIGS. 4-6, the flexures or radial extensions 110 are curved and in a disengaged position in their initial, undeflected state. The curved arrangement is subtle in these figures. The curved arrangement positions the distal engaging end 520, 530 away from the notched area 125 that it will engage as disclosed herein. Therefore, during connection or assembly, the radial extensions 110 are deflected towards the engagement groove, or notch area 125.

Prior art references are known to have flexures initially in a disengaged position, but where the disengaged position has the flexures initially straight, and where the flexures are in a curved arrangement when engaged with an engagement groove with no additional support along the length of the flexure. In such prior art, the structural effectiveness of the flexures is limited as they are susceptible to buckling when engaged as the flexures have a curved arrangement.

As disclosed herein with respect to the pending embodiments, by being initially curved as taught herein, the radial extensions 110 overcome this limitation because their shape is provided so that when deflected to their assembled position, they then have a straight arrangement and are fully supported by the contact surface 135. As a beam that is fully supported on both sides has a significantly higher allowable buckling load than an unsupported beam. In other words, the internal stress inside the straightened flexure may act as one side of a constraint or wall and the contact surface 135 acts as the other side. Being straight in the assembled position and constrained into a shape improves the structural effectiveness over the prior art.

As also shown in FIGS. 6-13, a connector, or locking device, 680 is shown. The connector 680 may be a threaded component, as disclosed. The connector 680 may be put in place once the dual sided flexure ring 400 is locked into place. Though a threaded arrangement is disclosed, other securing components may be used such as, but not limited to, a clamping device, detent device, etc.

Figure 8:
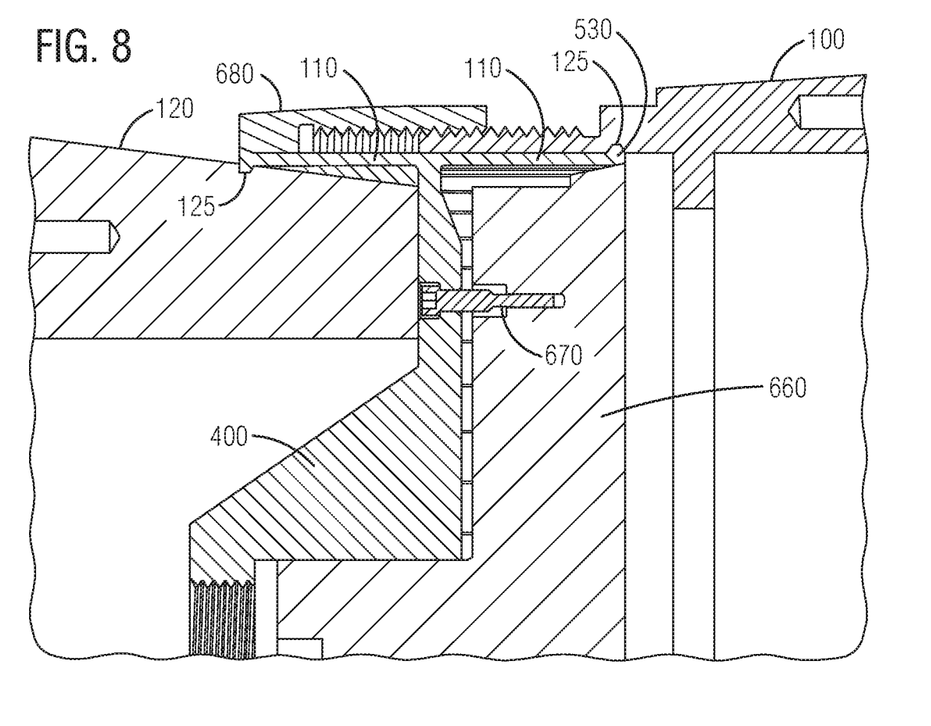
FIG. 8 shows a second installation of the dual sided flexure ring.
Figure 9:
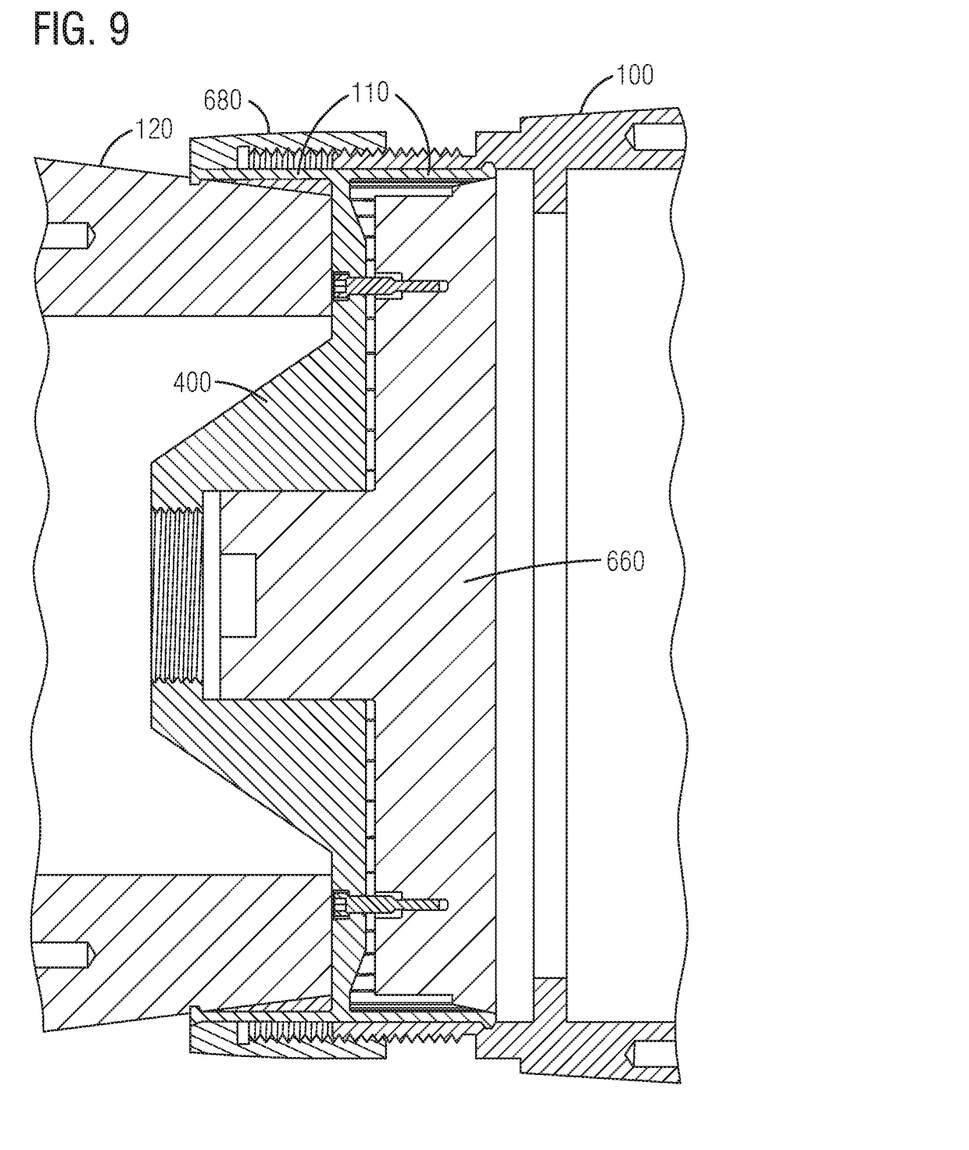
FIGS. 9-13 show separation of two parts of a structure at the dual sided flexure ring.
Figure 10:
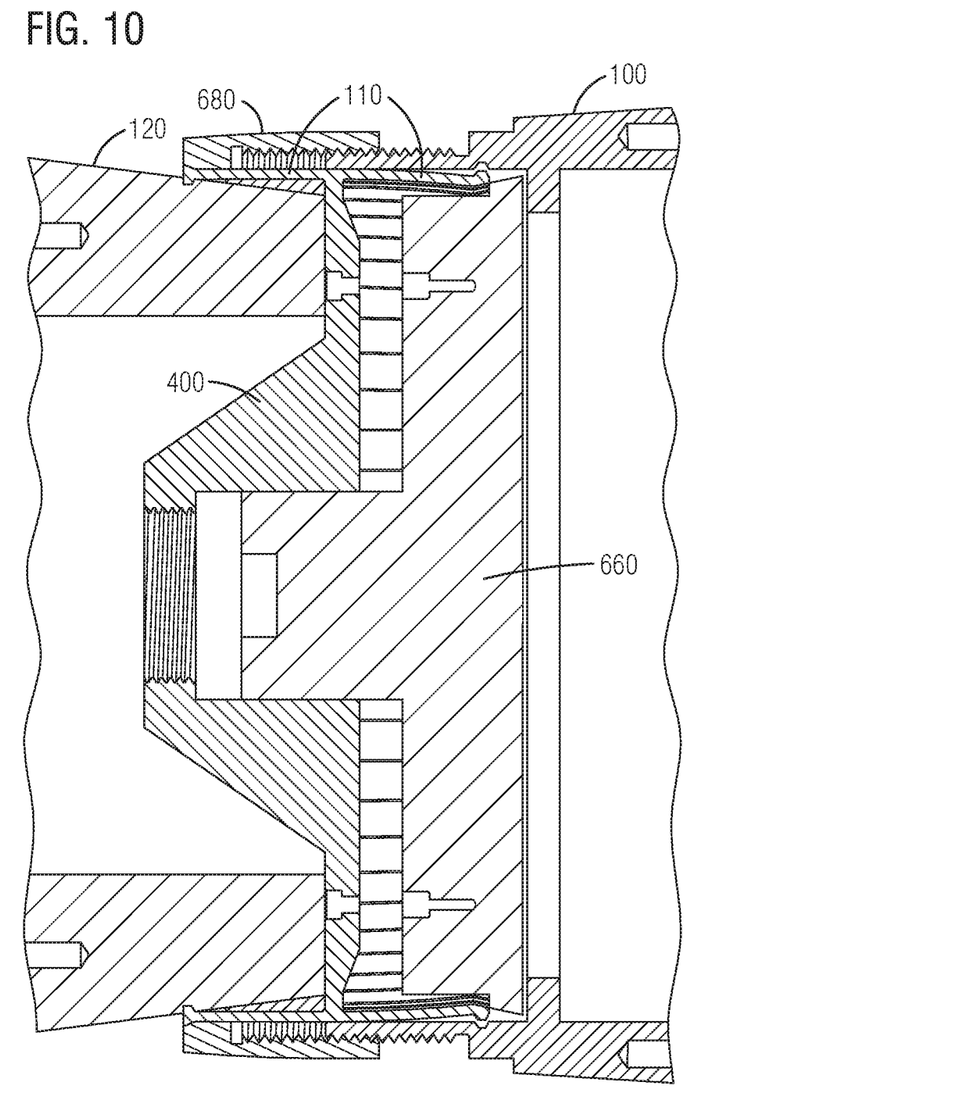
Figure 11:
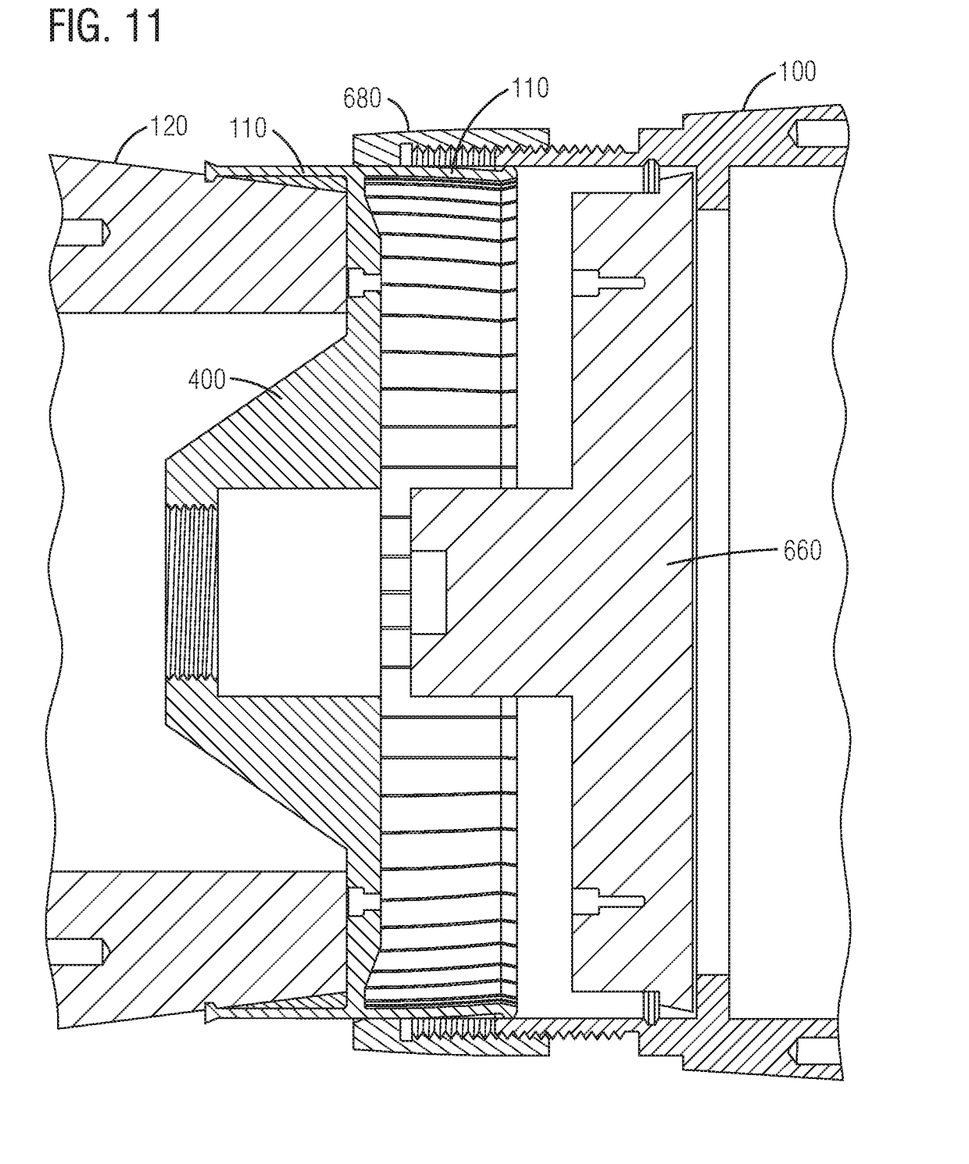
Figure 12:
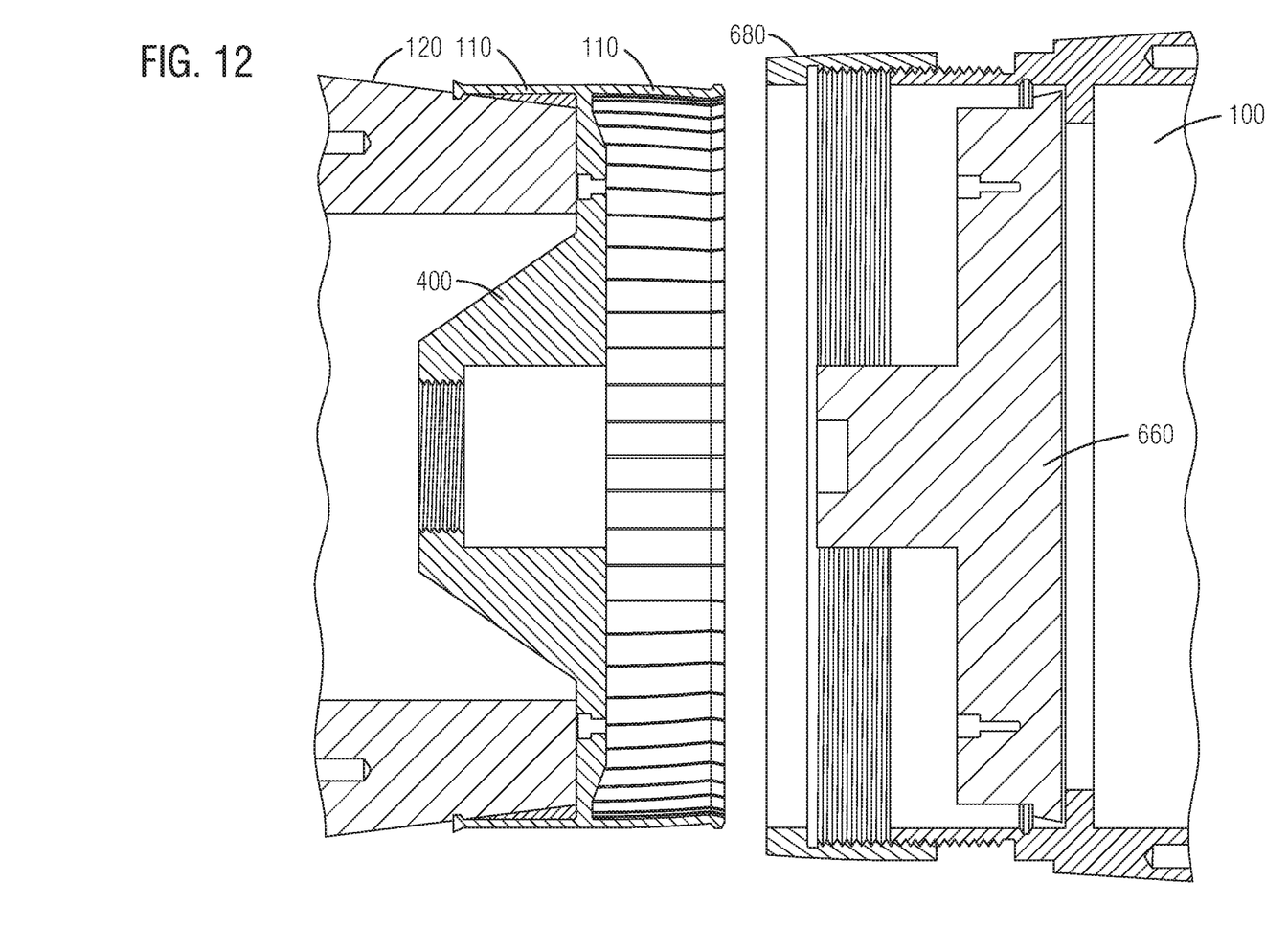
Figure 13:
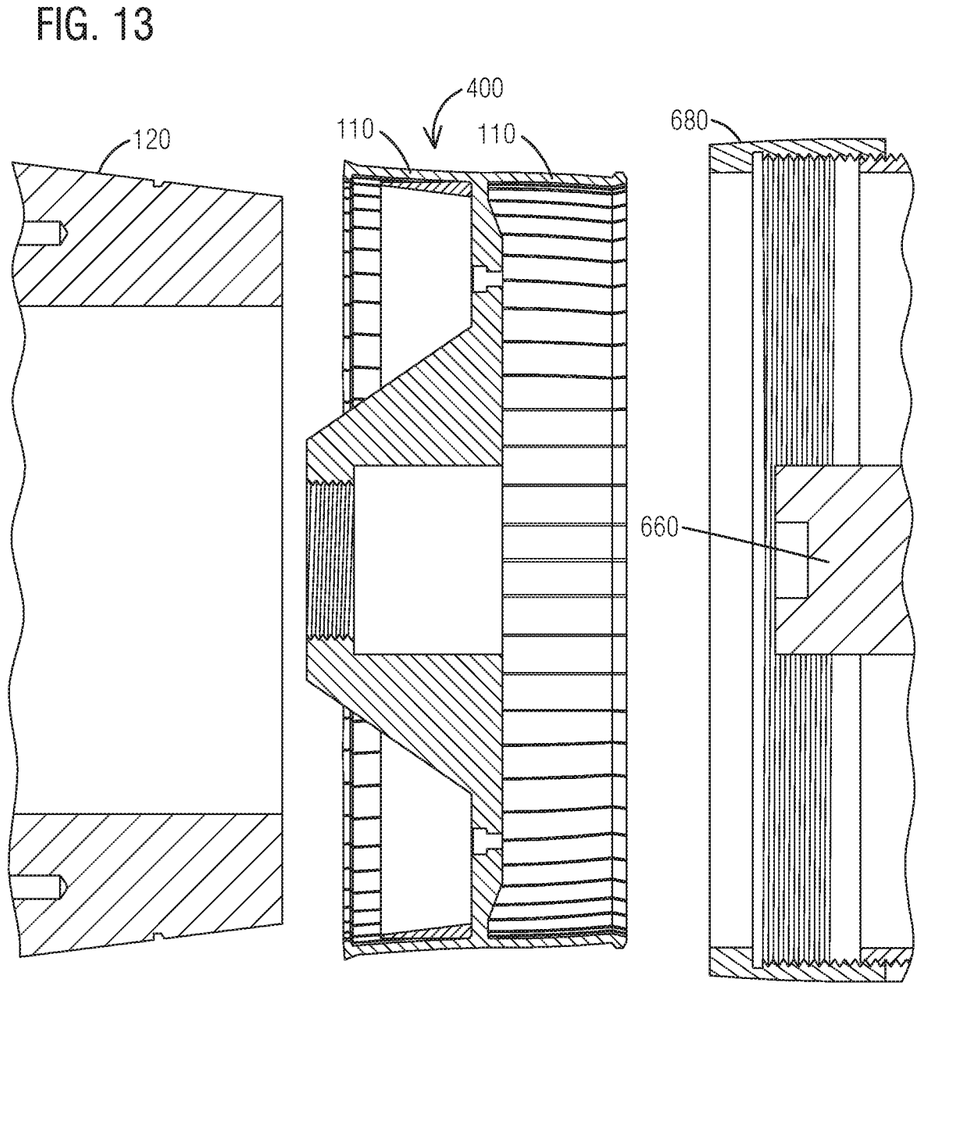

FIG. 8 shows a second installation of the dual sided flexure ring as a joint. FIG. 8 is a cross sections of an upper half of the dual sided flexure ring 400 between the first and second part 100, 120 such as, but not limited to, parts of a missile. As discussed above, at the distal ends of the radial extensions 110, the insertion elements 520, 530 are provided. Depending on the placement of the notched area, 125, the insertion elements 520 may be facing in a first direction on the first plurality of radial extensions 110 and in an opposite direction on the second plurality of radial extensions 530. The arrangement of the insertion elements 520, 530 may be determined by the location of the respective notched areas 125.

FIGS. 9-13 show separation of two parts of a structure at the dual sided flexure ring. As disclosed above with respect to FIGS. 5-8, the first plurality of radial extensions 110 and the second plurality of radial extensions 110 are locked into place by the piston 660 and the locking part 680. As shown in FIGS. 9-13, by application of a force by the actuation device such as, but not limited to, an explosion from an explosive device or movement by an electro-mechanical device, the piston 660 is forced to disengage from the first plurality of radial extensions 110. The force further causes the piston 660 to push against the first part 100 which causes the first part 100 to move away from the second part 120. By the first part 100 moving away from the second part 120, the locking device 680 releases the second plurality of radial extensions 110. The first part 100 is now disconnected from the second part 120, which provides for separation. In addition to the first part 100 and second part 120 separating, the dual sided flexure ring 400 may also separate from the first part 100.

Thus, in general, an actuation device such as, but not limited to, a directed explosion caused by an explosive device or a force generated by an electro-mechanical device, may activate the piston 660 which will disengage from the first plurality of radial extensions 110. The piston 660 continues moving towards and then past the first plurality of radial extensions 110 and impinges on the first part 100 and starts pushing the first part 100 away. In a non-limiting embodiment, the first part 100 is a booster of the small-scale missile. As the first part 100 moves away from the second part 120, the locking device 680 disengages from the second plurality of radial extensions 110. Since no other components are holding either element in place, the second part 120 and the joint 400 fall away from the first part 100.

The radial extensions 110 exert their own disengagement force as they spring back to their initial position. This eliminates a need for springs/plungers, or any other hardware to disengage the radial extensions 110 from the notched area 125.

Figure 14:
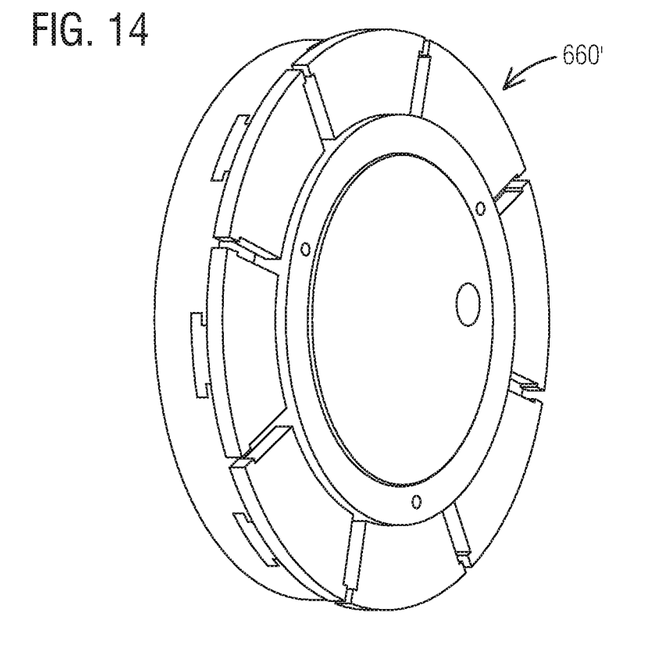
FIGS. 14 and 15 show a second embodiment of a movable device.
Figure 15:
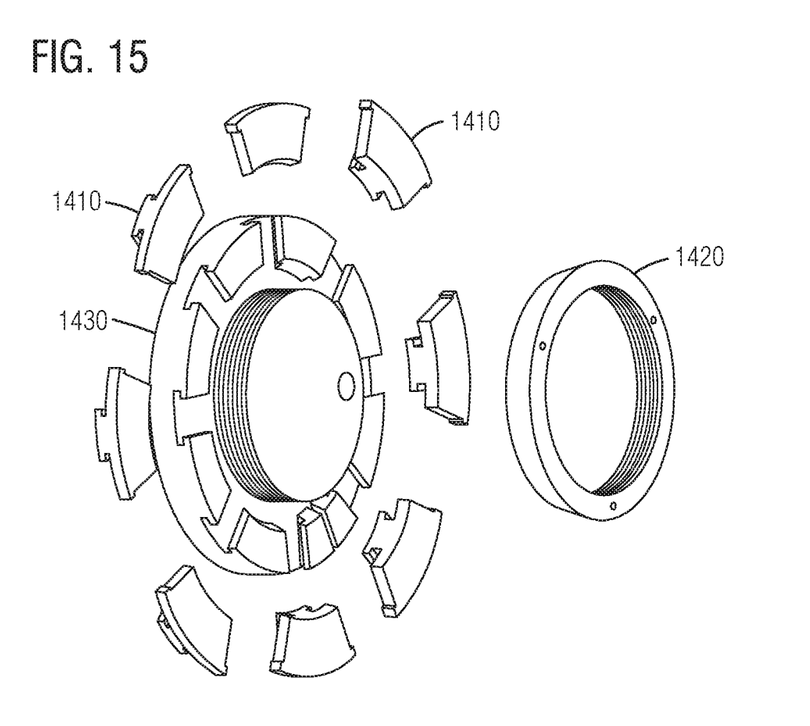

FIGS. 14 and 15 show a second embodiment of movable device. FIG. 14 shows the other movable device 660' once all parts are connected and FIG. 15 shows a view of the parts separated. The movable device 660' comprises a plurality of individual petals 1410 that move outwards to engage the extensions 110 and direct the extensions 110 into the notched areas 125 as a second ring 1420 is inserted onto a retaining device 1430. Though the second ring 1420 and the retaining device 1430 are shown with a threaded engagement relationship, other engagement techniques may be utilized.

More specifically, the movable device 660' comprises a plurality of individual petals 1410 that expand perpendicular towards a back side of the individual radial extensions 110 of at least a first plurality of radial extensions and a second plurality of radial extensions to direct a distal engagement end 520, 530 of the individual radial extensions 110 of at least the first plurality of radial extensions 110 within the first notched receiver 125 and the second plurality of radial extensions 110 within the second notch area 125. The petals 1410 may also retract to disengage the back side of the individual radial extensions 110 of at least the first plurality of radial extensions and the second plurality of radial extensions to release the distal engagement end 520, 530 of the individual radial extensions of at least the first plurality of radial extensions from within the first notched receiver 125 and the second plurality of radial extension from within the second notch area 125.

The movable device 660' may also comprise an inner engagement element 1420, 1430 that when activated causes the plurality of individual petals 1410 to extend perpendicularly towards the back side of the individual radial extensions 110 of at least the first plurality of radial extensions and the second plurality of radial extensions. When the engagement element 1420, 1430 is deactivated it causes the plurality of individual petals 1410 to retract from the back side of the individual radial extensions 110 of at least the first plurality of radial extension and the second plurality of radial extensions.

Figure 16:
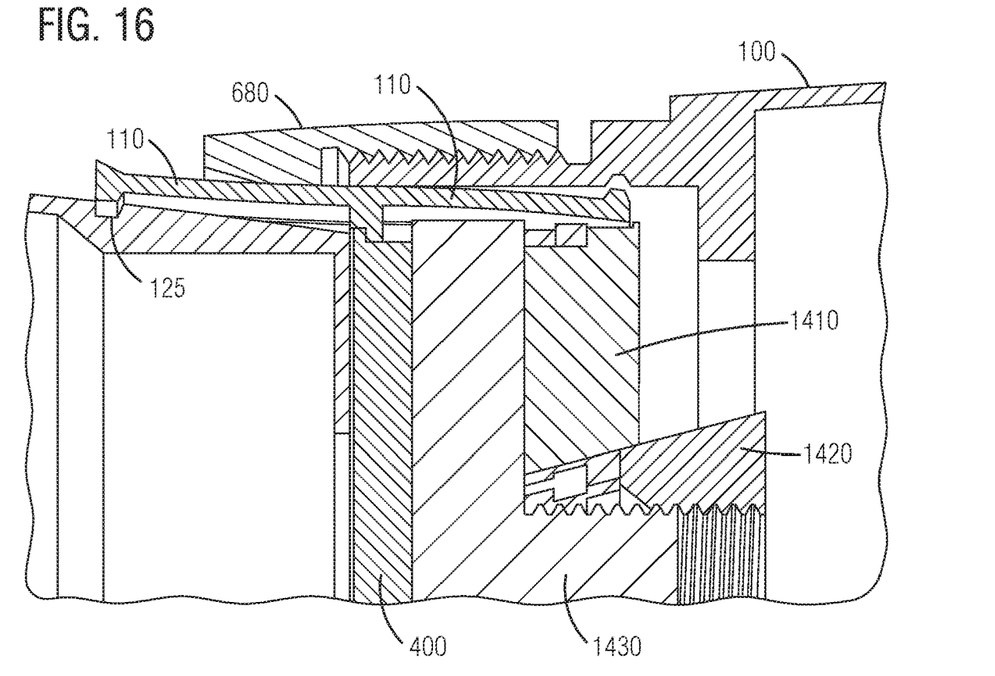
FIGS. 16 and 17 show the second embodiment of the movable device prior to and after installation.
Figure 17:
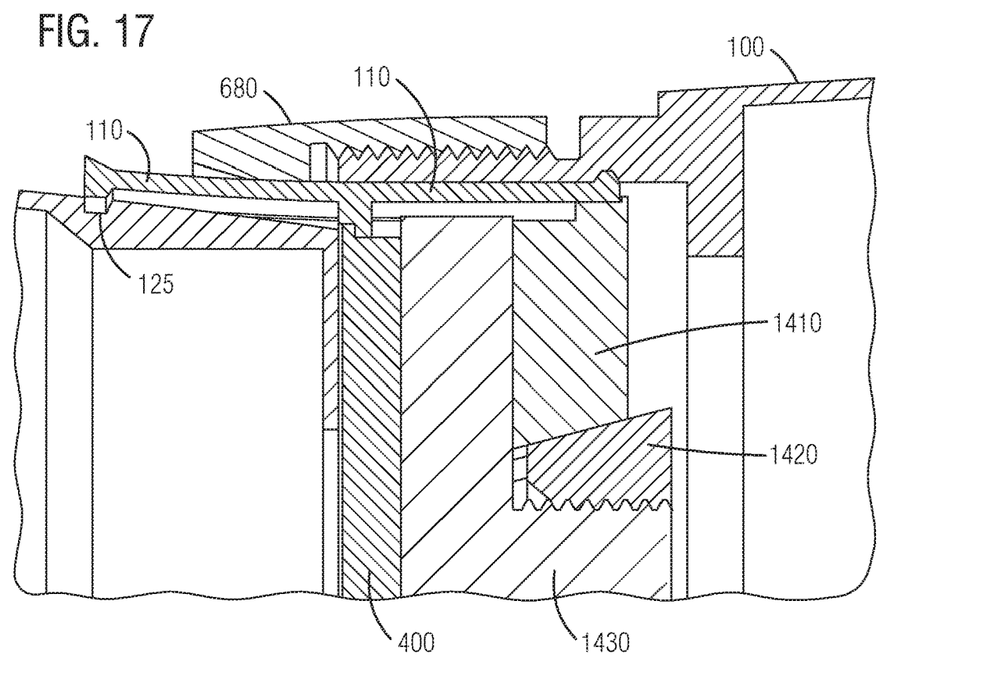

FIGS. 16 and 17 show the movable device in operation. FIG. 16 shows the retaining device 1420 before it is fully engaged with the retaining device 1430. As shown, the petals 1410 have not fully engaged the extensions 110 resulting in the extensions 110 engaging the notched area 125. As second ring 1420 is placed upon the retaining device 1430, the individual petals 1410 are pushed radially outward to engage the extensions 110 into the notched areas 125.

Figure 18:
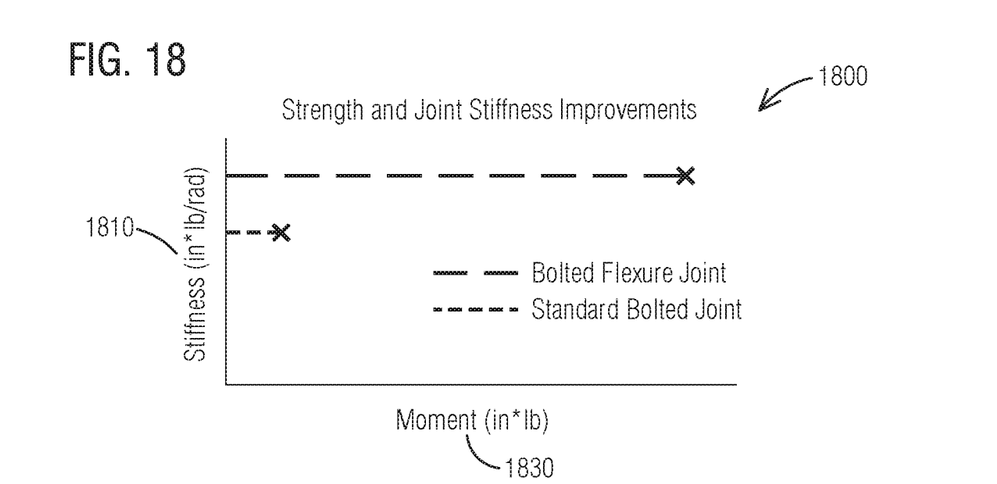
FIG. 18 shows predicted results of embodiments disclosed herein against prior art.

FIG. 18 shows simulation results of embodiments disclosed herein against prior art. A graphical representation 1800 of joint stiffness is provided. The x-axis 1810 of the chart 1800 provides for stiffness and the y-axis 1820 provides for moment. As shown, the embodiments disclosed herein provide for improved strength and stiffness when compared to a bolted joint.

Figure 19:
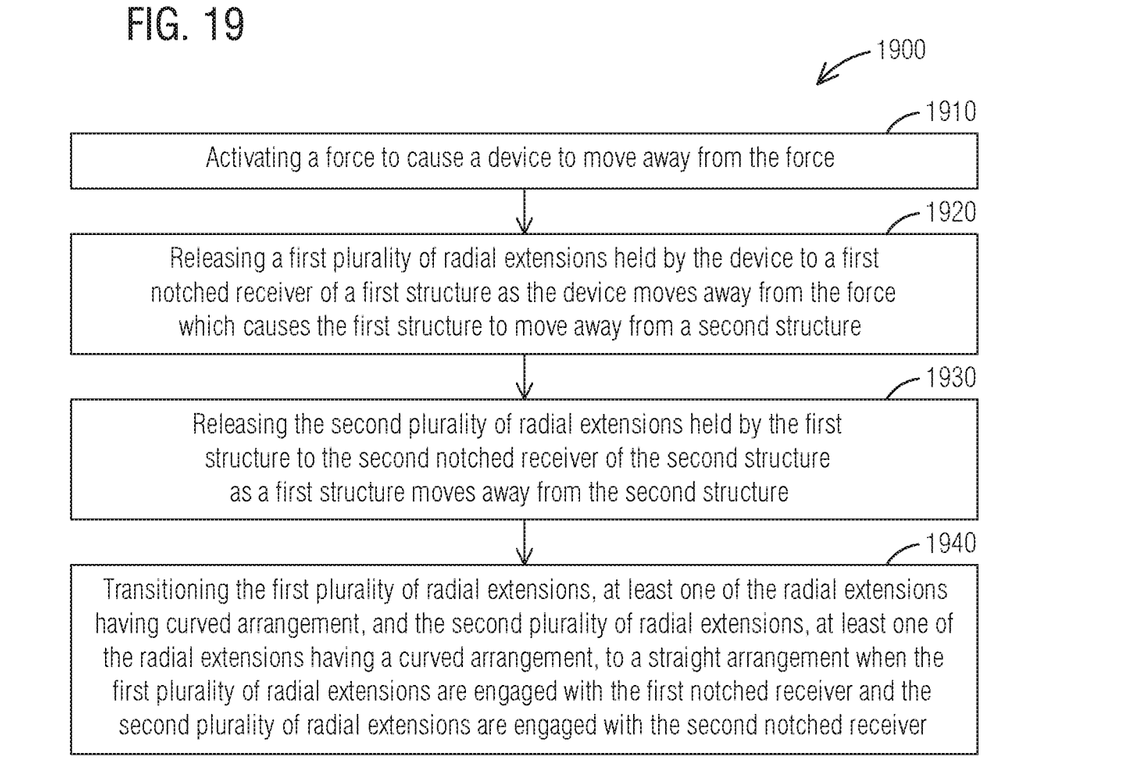
FIG. 19 shows a method of separation of adjacent parts of a structure.

FIG. 19 shows a method of separation adjacent parts of a structure. The method 1900 comprises activating a force to cause a device to move away from the force, at 1910. Though not limited, the force may be the result of a detonation, such as an explosive detonation. The method 1900 further comprises releasing a first plurality of radial extensions held by the device to a first notched receiver of a first structure as the device moves away from the force which causes the first structure to move away from a second structure, at 1920. The method 1900 further comprises releasing the second plurality of radial extensions held by the first structure to the second notched receiver of the second structure as the first structure moves away from the second structure, at 1930.

The method 1900 may further comprise transitioning the first plurality of radial extensions, at least one of the radial extensions having curved arrangement, and the second plurality of radial extensions, at least one of the radial extensions having a curved arrangement, to a straight arrangement when the first plurality of radial extensions are engaged with the first notched receiver and the second plurality of radial extensions are engaged with the second notched receiver, at 1940.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A joint system comprising:
a receiving device;
a plurality of radial extensions having a length extending in at least a first direction, each individual radial extension of the plurality of radial extensions terminating at a distal engagement end;
a support device having a notch area to receive the distal engagement ends of each radial extension of the plurality of radial extensions and a contact surface upon which the length of the radial extensions of the plurality of radial extensions engage when the distal engagement end of each radial extension of the plurality of radial extensions are engaged within the notch area; and
a movable device configured to move laterally towards the receiving device, along a back side of the plurality of radial extensions to engage with the back side of the plurality of radial extensions to direct the distal engagement end of each individual radial extension of the plurality of radial extensions within the notch area;
wherein at least one radial extension of the plurality of radial extensions is configured to be flexible between a first position to provide for assembly of the support device to the receiving device and a second position when the support device and the receiving device are assembled.

2. The system according to claim 1, wherein the plurality of radial extensions are a first plurality of radial extensions, and further comprising a second plurality of radial extensions, each radial extension of the second plurality of radial extensions having a distal end, extending in at least a second direction opposite the at least first direction.

3. The system according to claim 2, further comprising a dual sided flexure ring that comprises the first plurality of radial extensions and the second plurality of radial extensions.

4. The system according to claim 1, wherein the plurality of radial extensions are flexible between the first position and the second position, the first position being a curved arrangement and the second position being a straight arrangement.

5. The system according to claim 4, wherein the length of the plurality of radial extensions when in the straight arrangement is constrained in shape by the contact surface of the support device.

6. The system according to claim 4, wherein the support device comprises a first cylindrical arrangement.

7. The system according to claim 6, wherein the receiving device comprises a second notch area and has a second cylindrical arrangement.

8. The system according to claim 7, further comprising:
a second plurality of radial extensions having second distal engagement ends extending in a second direction opposite the first direction; and
a locking device attachable to the support device of an object that is a part of a structure, the locking device to lock the second distal engagement end to the second notch area of the receiving device.

9. The system according to claim 8, wherein the locking device is a threaded component and the support device comprises receiving threads.

10. A joint system comprising:
a support device;
a dual sided flexure ring having a first plurality of radial extensions having a length extending in a first direction from a first side of the ring and in at least a first curved arrangement and a second plurality of radial extensions having a length extending from a second side of the ring, the first side being opposite the second side and in a second direction in at least a second curved arrangement;
a first notch area in the support device to receive first distal engagement ends of the first plurality of radial extensions wherein the first plurality of radial extensions transition from the first curved arrangement to a first straight arrangement when moved within the first notch area;
a receiving device separate from the support device, the receiving device includes a second notch area to receive second distal engagement ends of the second plurality of radial extensions wherein the second plurality of radial extensions transition from the second curved arrangement to a second straight arrangement when moved within the second notched area;
a movable device that moves along a back side of the first radial extensions and laterally towards the receiving device to engage the first distal engagement ends into the first notch area, wherein the first plurality of radial extensions flex to the first straight arrangement; and
a contact surface upon which a length of the second plurality of radial extensions engages when the second distal engagement ends are engaged within the second notch area.

11. The joint system according to claim 10, further comprising a locking device attached to the support device to lock the second distal engagement ends in the second notch area wherein as the support device moves away from the receiving device, the locking device to release the second plurality of radial extensions.

12. The joint system according to claim 10, wherein the movable device further causes the dual sided flexure ring to separate from the first notch area.

13. The joint system according to claim 10, wherein the contact surface is a second contact surface and the support device includes a first contact surface upon which a length of the radial extensions of the first plurality of radial extensions engage when the first distal engagement end of each radial extension of the plurality of radial extensions are engaged within the first notch area.

14. The joint system according to claim 13, wherein the length of the first plurality of radial extensions when in the first straight arrangement is constrained in shape by the first contact surface of the support device and the length of the second plurality of radial extension when in the second straight arrangement are constrained in shape by the second contact surface.

* * * * *